United States Patent
Hidaka et al.

(10) Patent No.: US 11,988,267 B2
(45) Date of Patent: May 21, 2024

(54) CHAIN

(71) Applicant: TSUBAKIMOTO CHAIN CO., Osaka (JP)

(72) Inventors: Tatsuya Hidaka, Osaka (JP); Masahiro Koyama, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/965,492

(22) Filed: Oct. 13, 2022

(65) Prior Publication Data

US 2023/0117839 A1    Apr. 20, 2023

(30) Foreign Application Priority Data

Oct. 18, 2021  (JP) ................................. 2021-170368

(51) Int. Cl.
*F16G 13/06*       (2006.01)
(52) U.S. Cl.
CPC .................................. *F16G 13/06* (2013.01)
(58) Field of Classification Search
CPC ................................ F16G 13/06; F16G 13/00
USPC ........................................................ 474/230
See application file for complete search history.

(56) References Cited

U.S. PATENT DOCUMENTS

| | | | | |
|---|---|---|---|---|
| 2007/0082776 A1* | 4/2007 | Nagao | ..................... | F16G 13/06 474/228 |
| 2010/0093475 A1* | 4/2010 | Miyazawa | .............. | F16G 13/06 474/231 |
| 2012/0316020 A1* | 12/2012 | Miyazawa | .............. | F16G 13/06 474/230 |
| 2016/0116022 A1* | 4/2016 | Yokoyama | .............. | F16G 13/07 59/84 |
| 2020/0386297 A1* | 12/2020 | Koyama | ................. | F16G 15/12 |

FOREIGN PATENT DOCUMENTS

| | | | |
|---|---|---|---|
| JP | 2012-255523 A | 12/2012 | |
| WO | WO-2014023336 A1 * | 2/2014 | ............. F16G 13/06 |

* cited by examiner

*Primary Examiner* — Jacob S. Scott
*Assistant Examiner* — Emily R Kincaid
(74) *Attorney, Agent, or Firm* — WHDA, LLP

(57) ABSTRACT

To provide a chain that can reduce friction loss, alleviate wear on sliding surfaces of a chain guide member, and reduce vibration and noise of the running chain. The chain is made up of a multiplicity of inner link plates and outer link plates alternately coupled together by connecting pins along the longitudinal direction of the chain. The height from a pitch line to a highest point on a backside of the plurality of inner link plates (backside height of the inner link plates) is different from the height from a pitch line to a highest point on a backside of the plurality of outer link plates (backside height of the outer link plates) by more than 0 and not greater than 0.5 mm.

4 Claims, 2 Drawing Sheets

CHAIN

BACKGROUND OF THE INVENTION

1. Field of the Invention

The present invention relates to a chain such as a roller chain or bushing chain used in power transmission mechanisms of automobiles, industrial machines and the like.

2. Description of the Related Art

One of known conventional power transmission chains is made up of a large number of pairs of left and right inner link plates and pairs of left and right outer link plates each disposed on both outer sides of the pairs of left and right inner link plates, these inner link plates and outer link plates being alternately coupled together by connecting pins along a longitudinal direction of the chain.

The outer link plates and inner link plates of such a chain are both oval-shaped. These outer link plate and inner link plates have the same "backside" height that is defined as the distance from the pitch line of the chain to an outermost edge of the link plates. The outer link plates and inner link plates having the same backside height causes the problem of friction loss due to a large friction resistance when making contact with a chain guide, because both of the link plates make sliding contact with a chain guide member and the contact area is accordingly increased.

In the case where a roller chain is incorporated in a car engine and used as the timing chain, in particular, the large friction loss leads to poor fuel economy.

A roller chain designed to reduce friction loss to solve this problem has been known (see, for example, Japanese Patent Application Publication No. 2012-255523). The chain is composed of a multiplicity of outer link plates that do not make contact with a guide member, and elliptical inner link plates having convex edges to make contact with a sliding guide surface of the guide member, alternately coupled together by connecting pins. The overall contact area of the chain contacting the chain guide is made smaller so that friction loss is reduced.

SUMMARY OF THE INVENTION

This known chain that has a smaller overall contact area with a chain guide allows access of lubricant oil through the gap between the outer link plates and the chain guide so that friction loss can be reduced. On the other hand, the sliding surface of the chain guide member suffers severer wear due to the higher surface pressure caused by convex parts alone of the inner link plates making sliding contact with the chain guide member. Deep grooves can be formed by advanced wear in parts that make sliding contact with the inner link plates, which leads to vibration or noise caused by a behavior called "pitching" of the running chain (up and down movement of the inner link plates falling in and jumping out of the grooves as they start to make sliding contact with the sliding surface of the chain guide, or during the running on the sliding surface of the chain guide).

The present invention solves this problem and aims at providing a chain that can reduce friction loss, alleviate wear on sliding surfaces of a chain guide member, and reduce vibration and noise of the running chain.

To solve the above problem, the present invention provides a chain including: a multiplicity of pairs of left and right inner link plates; and a multiplicity of pairs of left and right outer link plates each disposed on both outer sides of the pairs of left and right inner link plates, the inner link plates and the outer link plates being alternately coupled together by connecting pins along a longitudinal direction of the chain, the plurality of inner link plates having a height from a pitch line to a highest point on a backside thereof (backside height of the inner link plates) that is different from a height from a pitch line to a highest point on a backside of the plurality of outer link plates (backside height of the outer link plates) by more than 0 and not greater than 0.5 mm.

To solve the above problem, the present invention provides a chain including: a multiplicity of pairs of left and right inner link plates; and a multiplicity of pairs of left and right outer link plates each disposed on both outer sides of the pairs of left and right inner link plates, the inner link plates and the outer link plates being alternately coupled together by connecting pins along a longitudinal direction of the chain, one of the plurality of inner link plates and the plurality of outer link plates having a curved backside that is convex toward a height direction of the chain at a middle in a longitudinal direction of the chain, and the other of the plurality of inner link plates and the plurality of outer link plates having a flat backside having a constant height along the longitudinal direction of the chain, the plurality of inner link plates having a height from a pitch line to a highest point on a backside thereof that is the same as a height from a pitch line to a highest point on a backside of the plurality of outer link plates.

According to the chain set forth in claim 1, the backside height of the plurality of inner link plates is differed from the backside height of the plurality of outer link plates by more than 0. In a condition where the sliding surface of the chain guide member is not worn yet, only one group of link plates makes sliding contact with the chain guide member so that the overall contact area between the chain and the chain guide is made smaller and friction loss can be reduced.

Since the backside height of the plurality of inner link plates is differed from the backside height of the plurality of outer link plates by not greater than 0.5 mm, the other group of link plates starts making slight contact with the chain guide member after the sliding surface of the chain guide member has worn to some extent, thus dividing surface pressure. This can retard formation of deep grooves by wear on the sliding surface of the chain guide member in parts that make sliding contact with one group of link plates, and thus vibration or noise issues caused by pitching of the running chain can be minimized.

According to the configurations set forth in claims 2 to 4, a reduction can be achieved both in friction loss and vibration or noise of the running chain.

According to the chain set forth in claim 5, one of the plurality of inner link plates and the plurality of outer link plates has a curved backside that is convex toward a height direction of the chain at a middle in a longitudinal direction of the chain, and the other of the plurality of inner link plates and the plurality of outer link plates has a flat backside having a constant height along the longitudinal direction of the chain, the plurality of inner link plates having a height from a pitch line to a highest point on a backside thereof that is the same as a height from a pitch line to a highest point on a backside of the plurality of outer link plates. While the convex parts of the curved backside and the flat backside make contact with the sliding surface at the same time in a condition in which the sliding surface of the chain guide member is not worn yet, the pressure concentrates at the convex parts of the curved backside because the sliding surface is slightly curved along the longitudinal direction of the chain and also undergoes small elastic deformation by the pressure applied thereto.

This is the same sliding condition in which the overall contact area between the chain and the chain guide is made smaller, and therefore the friction loss can be reduced.

When the sliding surface of the chain guide member has worn to some extent, the pressure that was concentrating on the convex parts of the curved backside is born also by the flat backside. This can retard formation of deep grooves by wear on the sliding surface of the chain guide member only in parts that make sliding contact with convex parts of the curved backside, and thus vibration or noise issues caused by pitching of the running chain can be minimized.

DESCRIPTION OF THE PREFERRED EMBODIMENT

A chain that is one embodiment of the present invention is described below with reference to the drawings.

Figure 1:
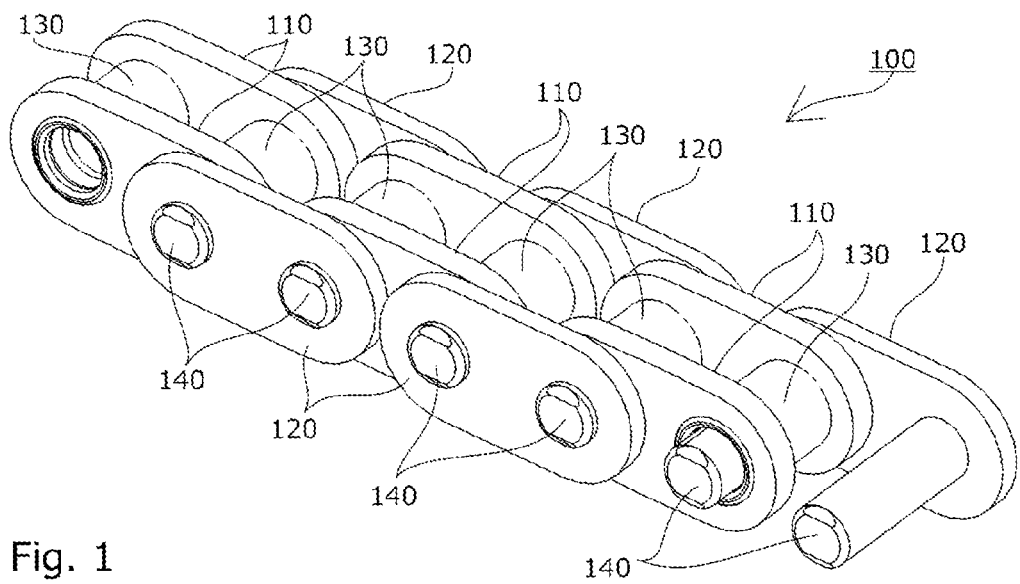
FIG. 1 is an illustrative diagram of a chain that is one embodiment of the present invention.
Figure 2:
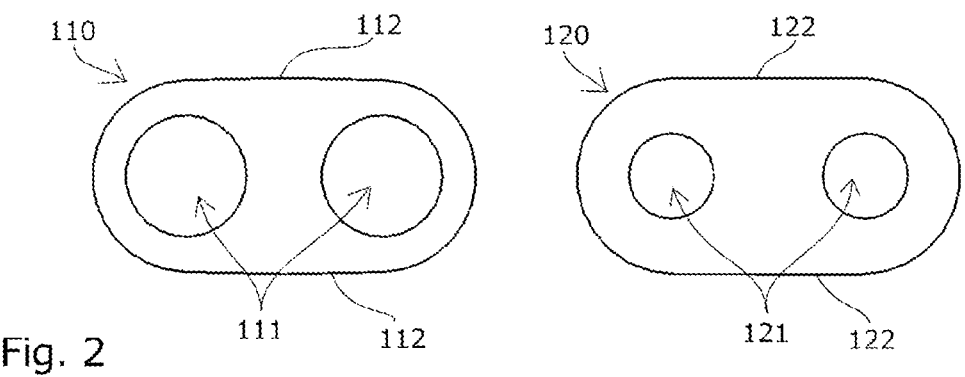
FIG. 2 is a side view of an outer link plate and an inner link plate of the chain that is one embodiment of the present invention.

As shown in FIGS. 1 and 2, the chain 100 includes pairs of left and right inner link plates 110, bushings 130 with their both ends press-fit in bushing holes 111 of the inner link plates 110, pairs of left and right outer link plates 120 disposed on both outer sides of the pairs of left and right inner link plates 110, and connecting pins 140 rotatably inserted in the bushings 130 and having both ends press-fit in pin holes 121 of the outer link plates 120. A large number of these inner link plates 110 and outer link plates 120 are alternately coupled together by the connecting pins 140 along the longitudinal direction of the chain.

Figure 3:
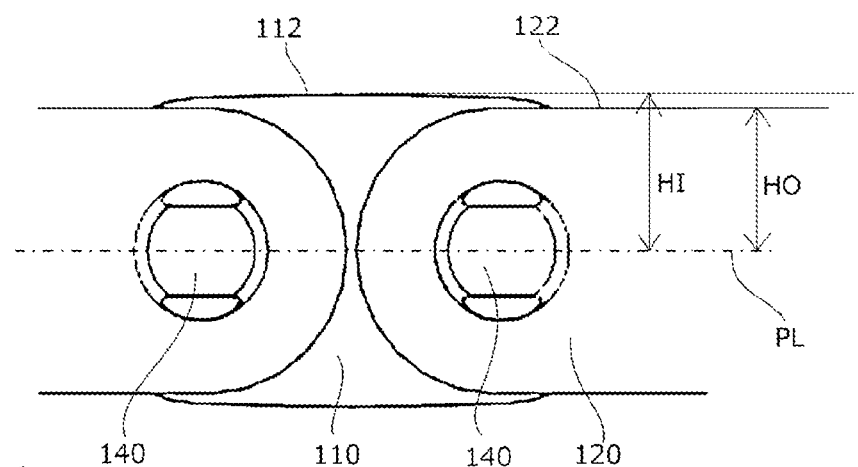
FIG. 3 is a schematic illustrative diagram of the backside heights of the outer link plate and inner link plate of the chain.

The inner link plate 110 in this embodiment has an outer surface or "backside" 112 as herein referred to that is curved and highest in the middle along the longitudinal direction of the chain. The distance from the pitch line PL of the chain 100 (line connecting centers of connecting pins 140) to the highest point of the outer edge is defined as the backside height HI as shown in FIG. 3.

The outer link plate 120 in this embodiment has an outer surface or "backside" 122 as herein referred to that is continuously flat in a portion highest along the longitudinal direction of the chain. The distance from the pitch line PL of the chain 100 (line connecting centers of connecting pins 140) to the highest point of the outer edge is defined as the backside height HO as shown in FIG. 3.

The relationship between the backside height HI of the inner link plate 110 and the backside height HO of the outer link plate 120 is set to HO+0.5 mm≥HI>HO in this embodiment.

Figures 4A, 4B:
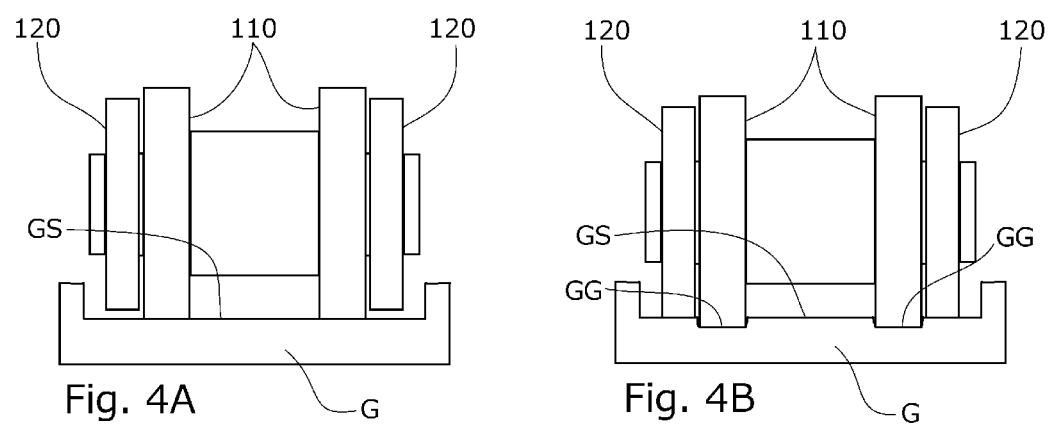
FIGS. 4A and 4B are schematic illustrative diagrams of the relationship between the chain and a chain guide.

Since HI>HO, when the sliding surface GS of a chain guide G is not worn yet as shown in FIG. 4A, the inner link plate 110 contacts the sliding surface GS only on the backside 112 while the outer link plate 120 does not contact the sliding surface GS on the backside 122, so that the friction resistance is lower.

Since HO+0.5 mm≥HI, the groove GG formed by wear due to contact with the backside 112 of the inner link plate 110 will not become deeper than 0.5 mm as shown in FIG. 4B, so that the adverse effect of pitching can be reduced.

Taking into consideration the elastic deformation of the sliding surface GS of the chain guide G at high tension and the clearance between the connecting pin 140 and the bushing 130, HI and HO should preferably satisfy HI≥HO+0.1 mm, in order to reliably prevent the backside 112 of the inner link plate 110 and the backside 122 of the outer link plate 120 from making sliding contact with the sliding surface GS of the chain guide G at the same time when the sliding surface GS is not worn yet.

If HO+0.3 mm≥HI, the adverse effect of pitching can be avoided more effectively.

In this embodiment, the backside 112 of the inner link plate 110 is curved so that friction resistance is reduced in a similar manner as the known technique described in the foregoing when the sliding surface GS of the chain guide G is not worn yet. The backside 112 of the inner link plate 110 may instead be formed as a flat surface.

The backside 122 of the outer link plate 120 is made flat so as to minimize the progress of wear after the sliding surface GS of the chain guide G has suffered wear to the extent that the backside 122 of the outer link plates 120 has come into contact with the sliding surface GS of the chain guide G. The backside 122 of the outer link plate 120 may instead be formed as a curved surface.

Also, alternatively, the backside height HO of the outer link plate 120 may be increased to satisfy HI+0.5 mm≥HO>HI, in which case, too, the backside 112 of the inner link plates 110 and the backside 122 of the outer link plates 120 may both be curved surfaces, or flat surfaces.

If one of the backside 112 of the inner link plates 110 and the backside 122 of the outer link plates 120 is a curved surface and the other is a flat surface, HO may be equal to HI.

While one embodiment of the present invention has been described in detail, the present invention is not limited to the above-described embodiment and may be carried out with various design changes without departing from the scope of the present invention set forth in the claims.

For example, while the embodiment described above is a bushing chain which makes contact with a sprocket on the bushings, the present invention is applicable to a roller chain having rollers loosely fitted on bushings, or a chain without bushings and with the inner link plates loosely fitted on connecting pins.

What is claimed is:

1. A chain comprising:
   a multiplicity of pairs of left and right inner link plates; and
   a multiplicity of pairs of left and right outer link plates each disposed on both outer sides of the pairs of left and right inner link plates, the inner link plates and the outer link plates being alternately coupled together by connecting pins along a longitudinal direction of the chain,
   the plurality of inner link plates having a height from a pitch line to a highest point on a backside thereof that is different from a height from a pitch line to a highest point on a backside of the plurality of outer link plates by more than 0 and not greater than 0.5 mm, wherein one of the plurality of inner link plates and the plurality of outer link plates has a curved backside that is convex toward a height direction of the chain at a middle in a longitudinal direction of the chain, and the other of the plurality of inner link plates and the plurality of outer link plates has a flat backside having a constant height along the longitudinal direction of the chain.

2. The chain according to claim 1, wherein the height from a pitch line to a highest point on the backside of the plurality of inner link plates is different from the height from a pitch line to a highest point on the backside of the plurality of outer link plates by 0.1 mm to 0.3 mm.

3. The chain according to claim 1, wherein the flat backside has a lower height from a pitch line than a height from a pitch line to a highest point on the curved backside.

4. A chain comprising:

a multiplicity of pairs of left and right inner link plates; and a multiplicity of pairs of left and right outer link plates each disposed on both outer sides of the pairs of left and right inner link plates, the inner link plates and the outer link plates being alternately coupled together by connecting pins along a longitudinal direction of the chain, one of the plurality of inner link plates and the plurality of outer link plates having a curved backside that is convex toward a height direction of the chain at a middle in a longitudinal direction of the chain, and the other of the plurality of inner link plates and the plurality of outer link plates having a flat backside having a constant height along the longitudinal direction of the chain, the plurality of inner link plates having a height from a pitch line to a highest point on a backside thereof that is the same as a height from a pitch line to a highest point on a backside of the plurality of outer link plates.

* * * * *